Nov. 30, 1937.　　　　D. I. REITER　　　　2,100,551
RADIATOR COVER CLIP
Filed Oct. 18, 1935
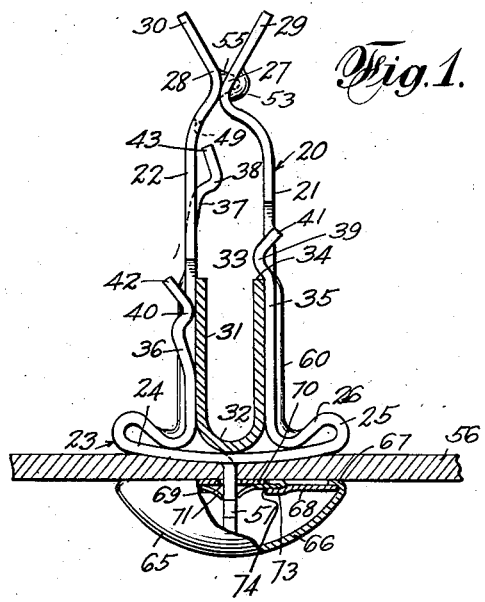
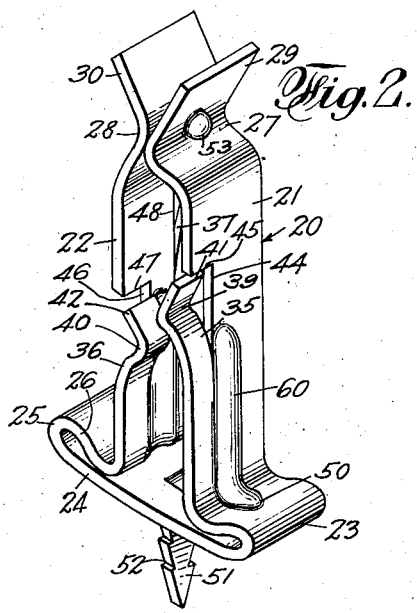
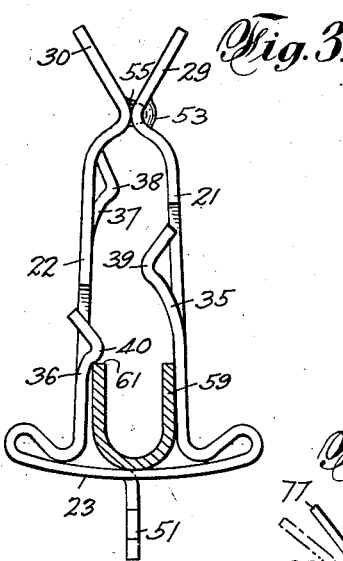
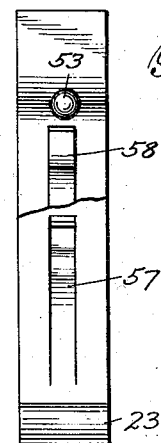
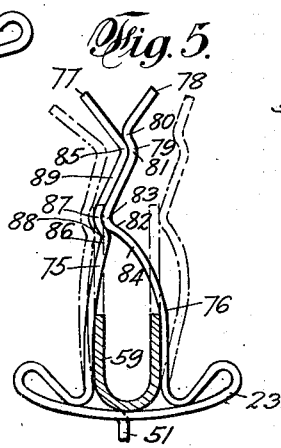
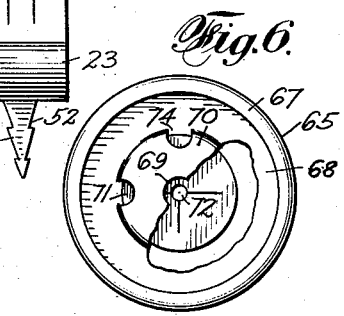
INVENTOR
Daniel I. Reiter
BY
ATTORNEY Patented Nov. 30, 1937

2,100,551

UNITED STATES PATENT OFFICE 2,100,551

RADIATOR COVER CLIP

Daniel I. Reiter, New York, N. Y.

Application October 18, 1935, Serial No. 45,566

14 Claims. (Cl. 24—73)

This invention relates to improvements in spring clips and particularly, to the type designed to removably secure a flexible cover of textile material or the like to the grill bars at the front of the radiator of an automobile, and is an improvement of the spring clip described in my prior Patent No. 2,013,446, dated September 3rd, 1935. In my said prior patent, the clip has a pair of substantially parallel sides and cooperating locking means near the extremities thereof, the sides being also provided with additional locking means intermediate their ends.

Since the grill bars of different automobiles vary considerably in size and shape, the present invention contemplates the provision of a clip adapted for use on various makes of cars, or in other words, the provision of a universal clip for various types and sizes of grill bars.

My invention further contemplates the provision of an inexpensive and efficient automobile-radiator-cover clip provided with a plurality of integral means for preventing the clip from being opened under vibration, shocks, or jars, to which it may be subjected while in use on either a wide or narrow grill bar.

My invention further contemplates the provision of a universal automobile-radiator-cover-clip adapted to fit so snugly on grill bars of varying widths as to substantially eliminate any movement of the clip while it is fitted about a grill bar, and further adapted to permit the removal of the clip from the grill bar when it is desired to do so, even though the ends of the clip are inaccessible.

The various objects of my invention will be clear from the description which follows and from the drawing, in which, Fig. 1 is a top plan view and partial horizontal section of my improved clip assembly, showing particularly, the plurality of staggered locking members of the clip which is shown as applied to a grill bar of about average width, and showing the radiator cover in place.

Fig. 2 is a perspective view of my improved clip showing particularly, the reinforcing ribs in the sides of the clip, and the integral attaching member designed to pierce the cover.

Fig. 3 is a top plan view of a modified form of my improved clip showing a narrow grill bar about which the clip is clasped, and showing the sides tapering somewhat toward each other.

Fig. 4 is a side elevation of another form of my improved clip, partly broken away, and showing the locking members cut from the center portion of the clip sides.

Fig. 5 is a side elevation of another modified form of my improved clip.

Fig. 6 is a rear elevation of the cap for engaging the attaching member to hold the clip to the cover.

In that practical embodiment of my invention which I have illustrated by way of example and referring particularly to Figs. 1 and 2, I have there shown the clip 20 made preferably of a single strip of flat wire and bent to form the separable sides 21 and 22 and the enlarged spring head 23, which head normally urges the sides 21 and 22 toward each other into substantially parallel relation.

As shown, the head comprises two thicknesses of material throughout the major part of its length, the outer thickness 24 extending transversely beyond the sides 21 and 22. At each of the ends of the thickness 24, there is provided an integral bend 25 joining the innermost thickness 26 of the material integrally to the thickness 24 and to one of the sides of the clip.

Near the outermost or free end portions of each of the sides 21 and 22, said sides are provided with reverse curve bends 27 and 28 respectively, parts of said bends extending inwardly into contact with each other, and the terminal parts at one of the ends of said bends being flared or diverging from each other, the other terminal parts being concave inwardly. The innermost point of the bend 27 is preferably arranged in vertical spaced relation to the corresponding point of the bend 28. The bends 27 and 28 are also preferably unsymmetrical, one extending inwardly further than the other. The free ends 29 and 30 of the clip are spaced apart sufficiently to permit the clip to be readily pushed on to and clasped about a grill bar as 31.

The grill bar having a rounded outer end portion 32, readily enters the space between the ends 29 and 30. When the clip is forced on to the grill bar, the rounded portion of said bar engages the bends 27 and 28 and spreads the clip sides 21 and 22 apart against the action of the spring head 23, thereby permitting the grill bar to enter the space 33 between the sides. After the innermost edge 34 of the bar has passed the bends 27 and 28, the spring action of the head urges the sides 21 and 22 together and again carries the bends 27 and 28 into contact, to permit the clip sides to engage the sides of the bar.

A series of integral flexible fingers of different lengths and movable relatively to the clip sides, are provided for selectively and firmly holding the clip against grill bars of varying widths, under the operating stresses thereon due to vibration, shock, jar and the like. Said spring fingers 35, 36 and 37 are struck out from the material of the sides 21 and 22 and project normally inwardly into the space 33. The end portions of said fingers are additionally bent inwardly as at 38, 39 and 40, preferably in the form of a reverse curve, similarly to the bends 27 and 28, the free ends of said fingers being flared or diverging outwardly as at 41, 42 and 43. While the lengths of the fingers vary considerably, I prefer to form each of them from the edge portion of the sides by means of an L-shaped cut represented by the straight-line perpendicular cuts 44 and 45 for the finger 35; 46 and 47 for the finger 36; and 48 and 49 for the finger 37. Each of said fingers is therefore free at one of its ends, but is integrally joined to the side of the clip at its other end, about which it may swing inwardly and outwardly.

It will be understood that while I have shown and described three fingers struck out from the sides, I may vary the number by adding additional fingers, or omitting one or more of the fingers, according to the degree of adaptability to varying widths of grill bars desired. Also, I may vary the widths of said fingers as desired, it being understood that comparatively wide fingers provide more spring resistance than narrow fingers. I prefer, however, to make the width of each finger about a third of the width of the clip side.

It will also be understood that where only two fingers are provided, they may be struck out of the diagonally opposite edges of the opposite sides 21 and 22 in the relative positions of the fingers 35 and 37, thereby reducing the amount of the material in the sides of the clip as little as possible.

The bent portions 27 and 28 of the sides may be utilized if desired to provide additional projections for engaging the inner edges of grill bars of different widths. In that case, as shown in Figs. 1 and 2, and as has been hereinbefore indicated, the bend 27 may extend from the side 21 inwardly toward the side 22 a greater distance than the corresponding portion 28 of the side 22 extends toward the side 21. At the same time, the innermost point of the bend 27 may be arranged below the corresponding innermost point of the bend 28, as viewed in Fig. 1. Two additional locking points for grill bars of the greatest widths usable with the clip are thereby provided.

For the purpose of reinforcing the sides 21 and 22 to resist undue bending thereof under the pressure of the grill bar, a longitudinal rib as 60 may optionally be pressed outwardly of each side along its center and may extend partway along the inner thickness 26 of the clip head 23 up to any desired point as 50. Thus the resistance of the sides of the clip to separation may be substantially increased, as compared to the resistance of the fingers.

As the grill bar moves through the space 33 from the ends 29 and 30 toward the head 26, it first spreads the sides 21 and 22 apart sufficiently to allow the grill bar to pass the bends 27, 28. Thereafter, a side of the grill bar engages the longest finger 37 and exerts lateral pressure upon said finger.

Should the finger 37 offer too great a resistance to bending outwardly back through the L slot from which it is formed, then the entire side 22 will bend as a unit instead of the finger bending relatively to its side. However, the rib 60 where provided, prevents such undue bending of the entire side 22 but instead, the finger 37 bends outwardly sufficiently beyond the inner surface of the side to permit the passage of the grill bar. Similarly, as the clip advances further on the grill bar, the finger 35 is bent outwardly through its slot, the side 20 at this time being prevented from undue bending relatively to the clip head 23 by its rib 60, where such rib is provided. If the grill bar is of medium width, the finger 37 is released as its edge passes the bent portion 38, said end springing inwardly to engage the extreme edge 34 of the grill bar and thereby to lock it in place, the fingers 35 and 36 remaining, however, pressed outwardly out of the space 33. Should the grill bar be narrow enough so that its edge is engaged by the bent portion 39 of the finger 35, then the finger 38 is entirely released and has no locking effect and the finger 36 is pressed outwardly out of the space 33 as illustrated in Fig. 1. In Fig. 3, the position of the fingers for the narrowest grill bar with which the clip is used, is shown.

As illustrated in Fig. 3, the reinforcing rib 60 may be omitted if desired. However, to overcome the tendency of the sides 21 and 22 to separate too much under the pressure of the grill bar upon the fingers, said sides are preferably tapered inwardly toward each other in a direction away from the head 23, whereby slight separation of the sides nevertheless permits the suitably shaped curved portions 38, 39 and 40 of the fingers to engage the edge of a grill bar of the width corresponding to the length of the finger.

In order to provide means for permitting a flexible automobile radiator cover to be attached to the clip after said clip has been arranged on the grill bar, a pointed attaching member 51 is struck out of the outer thickness 23 of the clip head so as to extend longitudinally therefrom. The attaching member may be provided with longitudinally spaced ratchet indentations 52 in order to prevent the cooperating cap 65 from being detached therefrom. A detailed description of this feature of the clip and of the cooperating cap adapted to be used with the flexible cover and the clip is to be found in the aforementioned Patent No. 2,013,446.

The cap 65 comprises the outer shell or dome 66, flanged inwardly as at 67 to hold the plate 68 in place by engaging the peripheral part of said plate. At its center, the plate is provided with an opening 69 for the passage of the member 51. The material 70 of the plate surrounding the opening 69 is pressed outwardly or in a direction away from the shell 66 to permit the arrangement thereunder of the slitted spring washer 71. Said washer is provided with a central opening 72 of less diameter than the least width of the member 51 beyond the first ratchet indentation thereof. To hold the washer in place in the recess below the part 70 of the plate 68, a series of circumferentially spaced lugs as 73 are pressed downwardly from the material at the edge of the part 70, a sufficient distance to form the washer recess 74, into which the washer is inserted and held between the lugs 73 and the part 70. The split washer yields to permit the forcible passage of the member 51 in the attaching direction, but resists detaching or separating movement of the member 51 away from the cap.

In Figs. 1, 2, 3 and 4, the additional cooperating locking means 53 and 55 is shown, said means including the indented portion 53 in the side 21 and arranged transversely of said side and projecting laterally and outwardly beyond the side to form a recess. Adapted to enter said recess, is the projection 55, pressed laterally and inwardly from the side 22 and normally in registration with the recess. This feature is also more fully described in my Patent No. 2,013,446, and is optional herein.

While I prefer to strike the spring fingers out of the edge portions of the sides 21 and 22, it will be understood that the fingers as 57 and 58 may be cut from the material of the center portion of the sides, as illustrated in Fig. 4. A series of such fingers longitudinally and centrally arranged on the sides of the clip may be provided if desired.

In the practical use of my invention, a series of clips without their caps as illustrated by Fig. 2, are pushed on to the various grill bars at the spaced intervals desired, with the attaching elements 51 projecting away from the bars. The cover sheet 56 is then arranged in the position desired outside of the grill and stretched and simultaneously forced on to the attaching element to cause said elements to penetrate the cover sheet and maintain it in its stretched state and position. The cooperating cap 65 is then forced on to each of the attaching elements and the cover sheet is secured to the clip between the clip and the cap in the manner described and illustrated in Patent No. 2,013,446 and shown in Fig. 1.

It will be seen that when the clip is attached to a comparatively narrow grill bar as 59 (Fig. 3), the finger 36 of the clip engages the extreme edge 61 of the bar. Similarly, when the clip is attached to a somewhat wider grill bar, as shown in Fig. 1, it is engaged by the spring finger 35 and similarly held firmly by the cooperation of the sides of the clip and the inwardly extending portion 39 of the finger 35. Where still wider grill bars are to receive the clip, the inwardly extending portion 38 of the finger 37 will similarly firmly grip the wider bar and the clip will be firmly and detachably secured to said bar.

In the event that a still longer grill bar is to receive the clip, the portions 27 and 28 of the sides 21 and 22 of the clip will likewise perform the function of gripping the extreme free edges of the grill bar, embracing them firmly, and preventing the clip from slipping or from being detached from the bar. In addition to the portions 27 and 28, the locking means 53 and 55 illustrated in Fig. 3 assist in preventing the clip from being accidentally removed from the grill bar.

As shown in Fig. 5, a series of staggered integral bends, each extending across the entire width of the side from which it is bent, may be made in each of the sides 75 and 76 of the clip. The innermost points of the respective bends are arranged at different distances from the spring head 23, and extend inwardly a different amount.

The respective end portions 77 and 78 of the sides 75 and 76 diverge similarly to the portions 29 and 30. In the side 76 just beyond the portion 78, is made the bend 79 in the form of a reverse curve, the part 80 of which is convex inwardly and the part 81 of which is concave inwardly. Between the bend 79 and the head, another intermediate bend 82 also in the form of a reverse curve is made. The part 83 of said bend 82 is convex inwardly and extends inwardly a greater distance than the part 81 and past the center line of the head 23. The concave part 84 engages the edge of the narrower grill bar 59, though said bars may vary in width.

The side 75 is provided with a preferably inwardly convex bend 85 just beyond the end part 77, said bend 85 normally fitting into the concave part 79 of the other side 76. Opposite the bend 82 of the side 76, a bend 86 also in the form of a reverse curve is made in the side 75. The concave part 87 of the bend 86 normally receives the convex part 83 of the bend 82, while the convex part 88 of said bend 86 extends into the concave part 84 of said bend 82 and projects inwardly only a comparatively slight amount. Between the bends 85 and 86, the side 75 may remain flat but inclined as at 89. Similarly, the side 76 may remain flat and inclined between the bends 79 and 82. It will be noted that the innermost points of said bends are at different distances from the head 23 and extend inwardly different amounts. The part 84 of one side 76 may engage the edges of a number of grill bars differing in width, while the inclined part 89 engages the edges of grill bars so wide as to extend past the convex part 83. In such cases, the convex parts 83 and 88 engage the sides of the grill bar and to hold it in place.

It will be seen that I have provided an economical one-piece improved spring clip for use with a grill bar of an automobile radiator and with a flexible cover for the radiator of such universal adaptability that it may be used on grill bars of various lengths, thereby eliminating the necessity for using clips of different lengths for differing sizes of grill bars.

It will further be seen that I have provided an improved clip adapted to be readily but removably secured to bars varying in width and designed to meet the severe requirements of practical use.

While I have shown and described certain specific embodiments of my invention, I do not wish to be understood as limiting myself thereto but intend to claim my invention as broadly as may be permitted by the state of the prior art and the scope of the appended claims.

I claim:

1. In a spring clip for use in holding an automobile-radiator-cover to the grill bar of an automobile radiator, a spring head, a pair of sides spaced transversely for part of the length thereof extending from the head, and a plurality of bent parts of said sides for engaging the edges of grill bars of different widths, said parts being arranged in longitudinally spaced relation, each of said parts being bent integrally from the material of one of the sides and being each provided with an inwardly and transversely directed bend in the shape of a reverse curve, the innermost points of the bends being at different distances from the head and extending inwardly different distances, and interengaging cooperating locking means on said sides.

2. A spring clip of a single piece of flat wire bent to form a spring head and a pair of and substantially coextensive sides spaced transversely for part of the length thereof, said head being integral with one end of each of the sides, an outwardly inclined end portion on each of the sides at the end opposite the head, an integral prong outstanding from the head and adapted to engage a capping member, and means on the sides intermediate the head and said ends for engaging grill bars varying in width to hold the clip to the grill bar, comprising a series of integral portions bent from the material of the sides and each provided with an inwardly extending bend in the shape of a reverse curve, the innermost point on the bends of said members being in longitudinal and transverse spaced relation, and cooperating locking means on said sides comprising an inward extension on one of the sides, and an opposed recessed portion on the other side for the reception of the extension.

3. In a clip for use in holding an automobile-radiator-cover to the grill bars of an automobile radiator, a pair of substantially coextensive sides arranged in spaced relation for the greater part of the length thereof and provided with a spring head urging said sides toward each other, said sides being provided with a pair of inwardly extending bends normally pressed into contact with each other by said head, and means intermediate the head and said bends for engaging the innermost edges of grill bars varying in width comprising a pair of grill bar edge-engaging portions, one of said portions being bent inwardly a predetermined amount from part of the material of one side and at a predetermined distance from said head and the other of said portions being bent inwardly from the material of the other side a different amount and at a different distance from said head.

4. In a clip provided with a pair of spring-pressed sides, an auxiliary spring member freed at one of its ends from the material at an edge of one of the sides and provided with an inwardly directed bend near the free end thereof, and a similar auxiliary member similarly freed from the material of the other side at a diagonally opposed edge of said other side and provided with a similar bend, the innermost edges of said bends being arranged in longitudinal spaced relation.

5. In a spring clip having a pair of sides spring-pressed toward each other, an auxiliary grill-bar-gripping member integral with but movable transversely relatively to one of the sides and arranged at an edge portion thereof, and a similar grill-bar-gripping member of different length arranged at an edge of the other side and diagonally opposed to the first-mentioned member.

6. In a grill bar-engaging clip for use in holding an automobile-radiator-cover to a grill bar, a pair of sides, and grill-bar-engaging members integral with the sides, one of said members having an end portion formed of material severed from one edge of one of said sides and of a predetermined length, and another of said members being partly severed from an edge portion of the other side and being of a different length.

7. In an automobile-radiator grill-bar-clip having a pair of substantially coextensive sides, a grill-bar-engaging member of one length cut at one end and one side edge from an edge portion of one of said sides, and a second similar member of a different length cut at one of its ends and one of its side edges from an edge portion of the other side.

8. In an automobile-radiator grill-bar-clip having a pair of substantially coextensive sides, a grill-bar-engaging member of one length cut at one end and one side edge from an edge portion of one of said sides, a second similar member of a different length cut at one of its ends and one of its side edges from an edge portion of the other side, and a reinforcing rib arranged longitudinally adjacent each of said members on each of said sides.

9. In an automobile-radiator grill-bar-engaging clip of a single piece of flat wire, an enlarged spring head and a pair of substantially coextensive sides extending longitudinally from the head, each of said sides being provided with an inwardly extending member cut therefrom along an end edge of the member and at least one side edge.

10. In an automobile-radiator grill-bar-engaging clip of a single piece of flat wire, an enlarged spring head and a pair of substantially coextensive sides extending longitudinally from the head, each of said sides being provided with an inwardly extending member cut therefrom along an end edge and at least one side edge, said members being of different lengths, and being arranged at the respective edge portions of said sides, and a longitudinal rib adjacent each of said members and extending into the head.

11. In an automobile grill-bar-engaging clip, a pair of flat wire sides, one of said sides being bent along at least two longitudinally spaced lines into the form of a reverse curve to provide a pair of spaced convex portions and a pair of concave portions adjacent the convex portions, the other side being bent at one point in the form of a reverse curve to provide a concave portion for the reception of one of the convex portions of the other side and to provide a convex portion entering the concave portion of said other side.

12. In an automobile grill-bar-engaging clip, a pair of flat wire sides, a spring head integral with and joining said sides, part of one of said sides being in the form of a reverse curve and providing a convex portion, part of the other side being in the form of a reverse curve and providing a concave portion for the reception of the convex portion of the other side and also providing a convex portion entering the concave portion of the other side, and a cap-engaging member integral with and outstanding from the head.

13. In a spring clip of flat wire for use in holding an automobile-radiator-cover to the grill bar of an automobile radiator, a spring head, a pair of elongated sides extending from the head and provided with respective diverging free end portions differing in length, an inwardly bent curved part of each of said sides extending inwardly and integrally from the material of each of said sides adjacent the free end portions and at different distances from the head, and an integral prong outstanding from the head and adapted to engage a capping member.

14. In a spring clip of a single piece of flat wire for use in holding an automobile-radiator-cover to the grill bars of an automobile radiator, a pair of substantially coextensive sides arranged in spaced relation for the greater part of the length thereof and terminating in free ends, a spring head integral with and urging said sides toward each other, a pointed member outstanding from the head and adapted to engage a capping member, and means intermediate the head and said free ends for engaging the innermost edges of grill bars varying in width, comprising a pair of grill bar edge-engaging portions, one of said portions being bent inwardly a predetermined amount from part of the material of one of the sides and at a predetermined distance from said head, and the other of said portions being bent inwardly from the material of the other of said sides a different amount and at a different distance from said head, each of said portions being in the form of a reverse curve.

DANIEL I. REITER.